United States Patent
Hirabayashi (10) Patent No.: US 7,328,120 B2
(45) Date of Patent: Feb. 5, 2008

(54) ACCELERATION/DECELERATION CONTROL METHOD AND APPARATUS AS WELL AS PROGRAM OF ACCELERATION/DECELERATION CONTROL METHOD

(75) Inventor: Tomokazu Hirabayashi, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/374,614

(22) Filed: Mar. 13, 2006

(65) Prior Publication Data
US 2006/0206284 A1   Sep. 14, 2006

(30) Foreign Application Priority Data
Mar. 14, 2005   (JP) ............................... 2005-070555

(51) Int. Cl.
*G01P 15/00*   (2006.01)
(52) U.S. Cl. ..................................................... 702/141
(58) Field of Classification Search ................. 702/141
See application file for complete search history.

(56) References Cited

U.S. PATENT DOCUMENTS

| | | | |
|---|---|---|---|
| 4,601,468 A | 7/1986 | Bond et al. | |
| 5,971,091 A | 10/1999 | Kamen et al. | |
| 6,084,374 A * | 7/2000 | Nakatsuka et al. | .... 318/568.18 |
| 6,519,860 B1 | 2/2003 | Bieg et al. | |
| 6,668,466 B1 | 12/2003 | Bieg et al. | |
| 7,102,315 B2 * | 9/2006 | Nakata et al. | ......... 318/568.22 |
| 2004/0128030 A1 * | 7/2004 | Nagata et al. | ............... 700/245 |

FOREIGN PATENT DOCUMENTS

| | | |
|---|---|---|
| JP | 07-261822 | 10/1995 |
| JP | 10-244482 | 9/1998 |
| KR | 1995-5077 | 5/1995 |
| KR | 1999-44574 | 6/1999 |

OTHER PUBLICATIONS

Communication from Korean Patent Office regarding related application.

* cited by examiner

*Primary Examiner*—Michael P. Nghiem
*Assistant Examiner*—Demetrius R. Pretlow
(74) *Attorney, Agent, or Firm*—Harness, Dickey & Pierce, P.L.C.

(57) ABSTRACT

To provide an acceleration/deceleration control method, apparatus and the like for determining the acceleration/decelerations of motors according to, for example, the drive directions, acceleration and deceleration of the motors by a simple algorism. A gravity torque calculation unit 1A calculates gravity torque acting on a joint drive motors for operating a manipulator 100 as a machine having joints, and an acceleration/deceleration calculation unit 1D calculates an acceleration speed and/or a deceleration speed of the joint drive motor based on an acceleration/deceleration correction coefficient and a set basic acceleration/deceleration, wherein the acceleration/deceleration correction coefficient is calculated by an acceleration/deceleration correction coefficient calculation unit 1B based on the gravity compensation coefficient selected from a plurality of preset gravity compensation coefficients according to a drive condition affected by gravity and on the gravity torque.

7 Claims, 3 Drawing Sheets

ACCELERATION/DECELERATION CONTROL METHOD AND APPARATUS AS WELL AS PROGRAM OF ACCELERATION/DECELERATION CONTROL METHOD

The entire disclosure of Japanese Patent Application No. 2005-070555, filed Mar. 14, 2005, is expressly incorporated by reference herein.

TECHNICAL FIELD

The present invention relates to an acceleration/deceleration control method, apparatus, and the like of a joint drive motor of, for example, a machine having a joint. In particular, the present invention is to control a joint drive motor subjected to the effect of gravity in, for example, a vertical articulated robot and the like.

BACKGROUND ART

In, for example, an articulated robot (hereinafter, referred to as manipulator) a problem arises in that torque saturation occurs because the torque of a joint drive motor (hereinafter, referred to as motor) is consumed by gravity torque acting on a joint portion due to gravity and that vibration remains when positioning is carried out. To overcome this problem, acceleration and/or deceleration (hereinafter, referred to as acceleration/deceleration, and the speed of acceleration/deceleration is referred to as acceleration/deceleration) must be adjusted in consideration of the effect of gravity acting on respective joints of the articulated manipulator.

Heretofore, there is proposed a method of calculating gravity torque in real time according to an attitude of a manipulator and canceling the effect of gravity feed-forwardly (refer to Patent Document 1). In the method, gravity torque acting on a joint is calculated from the attitude information of the manipulator, and the effect of gravity is cancelled by subtracting the gravity torque from a drive torque command of a motor. Further, there is also proposed a method of adjusting an acceleration/deceleration time constant based on a calculation formula derived from a motion equation using the position of a teaching point of a manipulator, the attitude of the manipulator, the drive directions and drive speeds of respective axes (refer to Patent Document 1).

[Parent Document 1] Japanese Unexamined Patent Application Publication No. 10-244482
[Parent Document 2] Japanese Unexamined Patent Application Publication No. 7-261822

DISCLOSURE OF THE INVENTION

Problems to be Solved by the Invention

However, in the method of canceling the effect of gravity feed-forwardly as described above, since it is intended to subtract the gravity torque calculated based on the attitude as it is and to cancel it, cancellation is not carried out according to drive directions and situations. In particular, since it is intended to cancel the effect of gravity torque indiscriminately, it is impossible to individually adjust, for example, torque saturation and residual vibration, which are subjected to the effect of gravity torque, according to objects. Further, as to the method of adjusting the acceleration/deceleration time constant, since a large amount of calculation is necessary to solve the motion formula, a calculation means having a high processing capability (CPU power) must be used to carry out a processing in real time.

Accordingly, an object of the present invention is to provide an acceleration/deceleration control method, apparatus, and the like that can determine the acceleration/deceleration of a motor according to a drive mode (in particular, situations such as drive directions, acceleration/deceleration, and the like of the motor) by a simple procedure.

Means for Solving the Problems

An acceleration/deceleration control method according to the present invention comprises a step of calculating gravity torque acting on a joint drive motor for operating a machine having a joint, a step of calculating an acceleration/deceleration correction coefficient based on the gravity torque and a gravity compensation coefficient, which is selected from a plurality of preset gravity compensation coefficients based on a drive mode affected by gravity, and a step of calculating the acceleration speed and/or the deceleration speed of the joint drive motor based on the acceleration/deceleration correction coefficient and a set basic acceleration/deceleration.

According to the present invention, since the acceleration/deceleration correction coefficient is calculated based on the calculated gravity torque and the gravity compensation coefficient, which is selected from the plurality of preset gravity compensation coefficients, and the acceleration speed and/or the deceleration speed of the joint drive motor is calculated based on the acceleration/deceleration correction coefficient and the set basic acceleration/deceleration, the acceleration/deceleration, which appropriately copes with the influence of gravity (for example, torque saturation, residual vibration, and the like) different depending on the drive mode can be calculated by a simple procedure after the gravity torque is calculated. Accordingly, a high speed calculation processing is not necessary and an expensive processing means need not be used.

Further, an acceleration/deceleration control method according to the present invention sets the gravity compensation coefficient based on the drive mode according to the drive direction and the acceleration/deceleration of the joint drive motor for the prevention of torque saturation of the joint drive motor and the suppression of residual vibration.

According to the present invention, since the gravity compensation coefficient is set according to the drive direction of the joint drive motor and to the acceleration/deceleration for the prevention of torque saturation and the suppression of residual vibration that greatly affect operation, the acceleration speed and the deceleration speed can be calculated by the gravity compensation coefficient based on the mode in which an influence due to torque saturation caused in acceleration in a direction opposite to a gravity acting direction or residual vibration caused in positioning accompanied with deceleration is liable to occur, thereby torque saturation can be prevented and residual vibration can be suppressed effectively.

Further, an acceleration/deceleration control method according to the present invention comprises a step of calculating gravity torque acting on a joint drive motor for driving a joint of a machine having the joint in the attitudes of the machine at the start of a motion and at the end of the motion based on data as to the start and the end of the motion of the machine and based on data as to the mechanism parameter and/or the payload of the machine, a step of calculating an acceleration/deceleration correction coefficient at the time when acceleration and/or deceleration is carried out in the above motion based on gravity compensation coefficients determined according to the drive direction and the acceleration/deceleration of the joint drive motor, the gravity torque, and the output torque of the joint drive motor, and a step of calculating the acceleration speed and/or the deceleration speed of the joint drive motor by multiplying the acceleration/deceleration correction coefficient by a set basic acceleration/deceleration.

According to the present invention, the acceleration/deceleration compensation coefficient is calculated based on the gravity torque in the attitudes at the start the end of the motion, on the gravity compensation coefficient set according to the drive direction and the acceleration/deceleration of the joint drive motor for the prevention of torque saturation and the suppression of residual vibration and on the output torque, and the acceleration speed and/or the deceleration speed is calculated by multiplying the acceleration/deceleration correction coefficient by the basic acceleration/deceleration. As a result, the acceleration/deceleration that appropriately copes with torque saturation and residual vibration greatly affected by gravity can be calculated by a simple procedure. Therefore, a high speed calculation processing is not necessary and an expensive processing means need not be used.

Further, an acceleration/deceleration control method according to the present invention further comprises a step of setting a maximum value and a minimum value of the acceleration/deceleration correction coefficient and restricting acceleration/deceleration correction speed coefficient to the maximum value or the minimum value when it is determined that the calculated acceleration/deceleration correction coefficient is out of the range between the minimum value and the maximum value.

According to the present invention, since the acceleration/deceleration correction coefficient is restricted, safety in operation can be secured.

Further, in an acceleration/deceleration control method according to the present invention, the machine is an articulated manipulator.

The invention described above exhibits a largest effect to an articulated manipulator that takes various attitudes and requires more minute acceleration/deceleration control and positioning.

Further, an acceleration/deceleration control apparatus according to the present invention comprises a gravity torque calculation means for calculating gravity torque acting on a joint drive motor for operating an articulated manipulator, an acceleration/deceleration correction coefficient calculation means for calculating an acceleration/deceleration correction coefficient based on the gravity torque and a gravity compensation coefficient, which is selected from a plurality of preset gravity compensation coefficients based on a drive mode affected by gravity, and an acceleration/deceleration calculation means for calculating the acceleration speed and/or the deceleration speed of the joint drive motor based on the acceleration/deceleration correction coefficient and a set basic acceleration/deceleration.

According to the present invention, the acceleration/deceleration correction coefficient calculation means calculates the acceleration/deceleration correction coefficient based on the gravity torque calculated by the gravity torque calculation means and the gravity compensation coefficient selected from the plurality of preset gravity compensation coefficients depending on, for example, the drive mode, and the acceleration/deceleration calculation means calculates the acceleration speed and/or the deceleration speed of the joint drive motor based on the acceleration/deceleration correction coefficient and the set basic acceleration/deceleration. As a result, the respective means can calculate the acceleration/deceleration, which appropriately copes with the influence of gravity (torque saturation, residual vibration, and the like) different depending on the drive mode, by a simple procedure without carrying out a complex calculation. Therefore, the cost of the apparatus can be also reduced.

An acceleration/deceleration control apparatus according to the present invention comprises a gravity torque calculation means for calculating gravity torque acting on a joint drive motor for driving a joint provided in an articulated manipulator in the attitudes of the articulated manipulator at the start of a motion and at the end of the motion based on data as to the start and the end of the motion of the articulated manipulator and based on data as to the mechanism parameter and/or the payload of the articulated manipulator, an acceleration/deceleration correction coefficient calculation means for calculating an acceleration/deceleration correction coefficient when acceleration and/or deceleration is carried out in the above motion based on gravity compensation coefficients determined according to the drive direction and the acceleration/deceleration of the joint drive motor, the gravity torque, and the output torque of the joint drive motor, and an acceleration/deceleration calculation means for calculating the acceleration speed and/or the deceleration speed of the joint drive motor by multiplying the acceleration/deceleration correction coefficient by the basic acceleration/deceleration set to the joint.

According to the present invention, since the acceleration/deceleration correction coefficient calculation means calculates the acceleration/deceleration correction coefficient based on the gravity torque in the attitude at the start and at the end of the motion calculated by the gravity torque calculation means, on the gravity compensation coefficient set according to the drive direction and the acceleration/deceleration of the joint drive motor for the prevention of torque saturation and the suppression of residual vibration, and on the output torque, and the acceleration/deceleration calculation means calculates the acceleration speed and/or the deceleration speed by multiplying the acceleration/deceleration correction coefficient by the basic acceleration/deceleration. As a result, the acceleration/deceleration, which appropriately copes with torque saturation and residual vibration greatly affected by gravity, can be calculated by a simple procedure without carrying out a complex calculation. Therefore, the cost of the apparatus can be also reduced.

Further, an acceleration/deceleration control apparatus according to the present invention further comprises a coefficient check means for restricting the acceleration/deceleration correction coefficient calculated by the acceleration/deceleration correction coefficient calculation means to a maximum value or a minimum value based on the maximum value and/or the minimum value set to the acceleration/deceleration correction coefficient.

According to the present invention, since the coefficient check means checks the acceleration/deceleration correction coefficient and restricts the maximum value and the minimum value thereof, safety in operation can be secured.

An acceleration/deceleration control apparatus according to the present invention further comprises a determination means for determining a joint having a maximum moving time based on the moving times of respective joints, and an acceleration/deceleration adjustment means for recalculating acceleration speeds and/or deceleration speeds in conformity with the maximum moving time as to the joints other than the joint having the maximum moving time.

According to the present invention, the determination means determines the joint having the maximum moving time based on the moving times of respective joints, and the acceleration/deceleration adjustment means recalculates the acceleration speeds and/or deceleration speeds of the joints other than the joint having the maximum moving time and adjusts them in conformity with the maximum moving time. As a result, the joints other than the joints having the maximum moving time have an allowance of the acceleration/decelerations, thereby the effect of the gravity can be more reduced.

A program of an acceleration/deceleration control method according to the present invention causes a computer to carry out a step of calculating gravity torque acting on a joint drive motor for operating a machine having a joint, a step of calculating an acceleration/deceleration correction coefficient based on the gravity torque and a gravity compensation coefficient selected from a plurality of preset gravity compensation coefficients based on a drive mode, and a step of calculating the acceleration speed and/or the deceleration speed of the joint drive motor based on a set basic acceleration/deceleration and the acceleration/deceleration correction coefficient.

According to the present invention, the acceleration/deceleration correction coefficient is calculated based on the calculated gravity torque and the gravity compensation coefficient, which is selected from the plurality of preset gravity compensation coefficients, and the acceleration speed and/or the deceleration speed of the joint drive motor is calculated based on the acceleration/deceleration correction coefficient and the set basic acceleration/deceleration. Accordingly, the acceleration/deceleration, which appropriately copes with the influence of gravity (for example, torque saturation, residual vibration, and the like) different depending on the drive mode can be calculated by a simple procedure. As a result, even a computer that cannot carry out an arithmetic operation processing at high speed can cope with the calculation.

A program of an acceleration/deceleration control method according to the present invention causes a computer to carry out a step of calculating gravity torque acting on a joint drive motor for driving a joint of a machine having the joint, in the attitudes of the machine at the start of a motion and at the end of the motion based on data as to the start and the end of the motion of the machine and based on data as to the mechanism parameter and/or the payload of the articulated manipulator, a step of calculating an acceleration/deceleration correction coefficient at the time when acceleration and/or deceleration is carried out in the above motion based on gravity compensation coefficients determined according to the drive direction and the acceleration/deceleration of the joint drive motor, the gravity torque, and the output torque of the joint drive motor, and a step of calculating the acceleration speed and/or the deceleration speed of the joint drive motor by multiplying the acceleration/deceleration correction coefficient by a basic acceleration/deceleration set to the joint.

According to the present invention, the acceleration/deceleration correction coefficient is calculated based on the gravity torque in the attitudes at the start and the end of the motion including the data as to the mechanism parameter and/or the payload of the machine, the gravity compensation coefficients set according to the drive direction and the acceleration/deceleration of the joint drive motor for the prevention of gravity torque and the suppression of residual vibration, and the output torque, and the acceleration speed and/or the deceleration speed is calculated by multiplying the acceleration/deceleration correction coefficient by the basic acceleration/deceleration. Accordingly, the acceleration/deceleration that appropriately copes with torque saturation and residual vibration greatly affected by gravity can be calculated by a simple procedure. As a result, even a computer that cannot carry out an arithmetic operation processing at high speed can cope with the calculation.

Further, a program of an acceleration/deceleration control method according to the present invention further causes a computer to carry out a step of restricting a maximum value or a minimum value of the acceleration/deceleration correction coefficient based on the calculated acceleration/deceleration correction coefficient.

According to the present invention, since the acceleration/deceleration correction coefficient is restricted, the safety control of the machine can be carried out by the computer.

BEST MODE FOR CARRYING OUT THE INVENTION

EMBODIMENT 1

Figure 1:
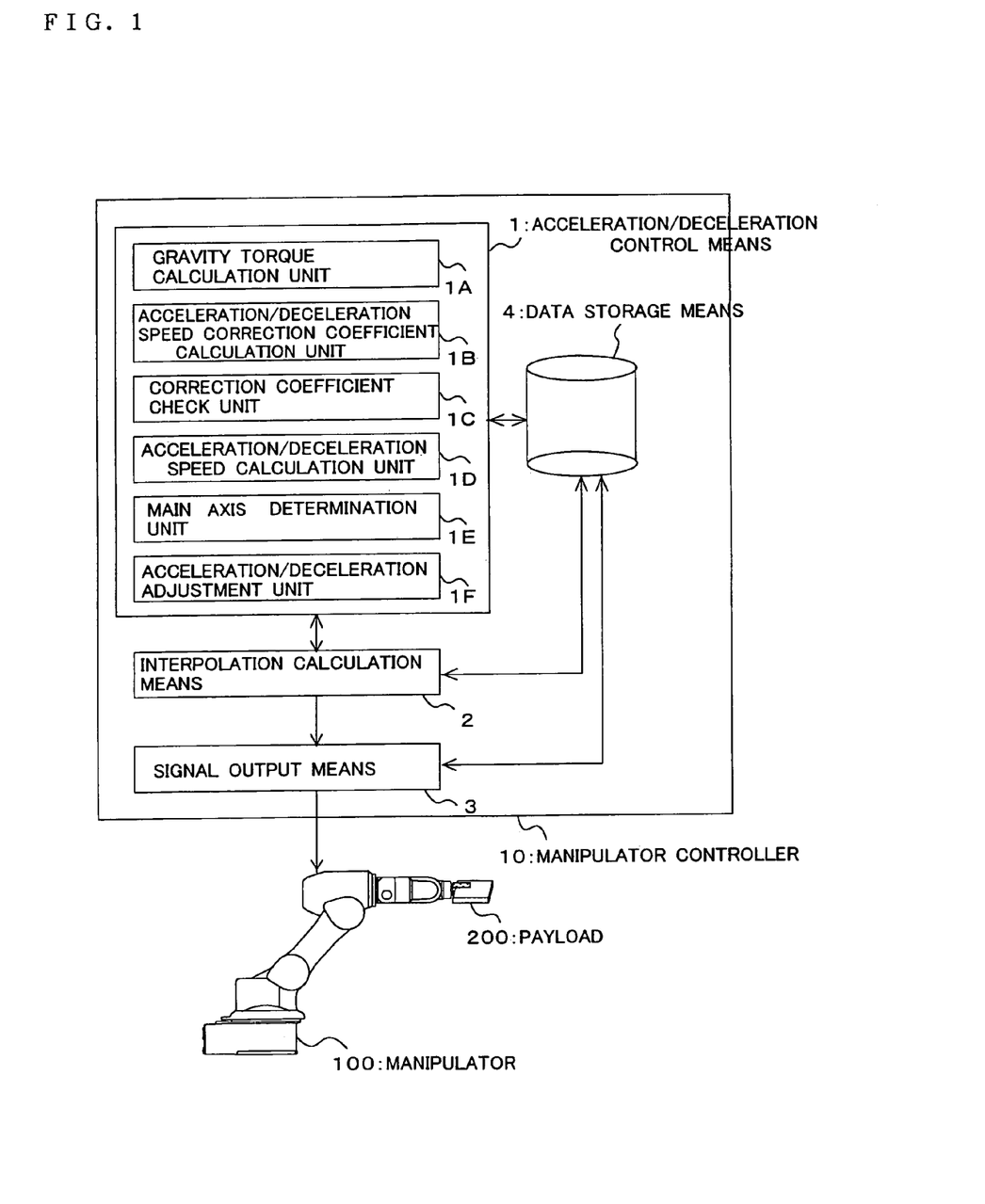
FIG. 1 is a view mainly showing a manipulator controller 10 according to an embodiment 1.

FIG. 1 is a view showing a system having a manipulator controller as a central portion thereof according to an embodiment 1 of the present invention. In FIG. 1, the manipulator controller 10 of the embodiment is composed of an acceleration/deceleration control means 1, an interpolation calculation means 2, a signal output means 3, and a data storage means 4. The manipulator controller 10 controls the motion of a manipulator 100 by outputting a drive signal. The embodiment will mainly explain the control of speeds, which include the acceleration/deceleration of a rotational driving of a motor shaft at each joint (shaft) of the manipulator 100 (basically, at least each once of acceleration and deceleration is included in one motion).

The acceleration/deceleration control means 1 is further composed of a gravity torque calculation unit 1A, an acceleration/deceleration correction coefficient calculation unit 1B, a correction coefficient check unit 1C, an acceleration/deceleration calculation unit 1D, a main joint determination unit 1E, and an acceleration/deceleration adjustment unit 1F. The gravity torque calculation unit 1A calculates gravity torque generated at joints by the effect of gravity as to the respective joints of the manipulator 100. Further, the acceleration/deceleration correction coefficient calculation unit 1B calculates the acceleration/deceleration correction coefficients of the respective joints based on the gravity torque. Then, the correction coefficient check unit 1C determines whether or not the acceleration/deceleration correction coefficients are within the range between a determined maximum value and a determined minimum value to, for example, restrict the effect of the acceleration/deceleration correction coefficients. When it is determined that the acceleration/deceleration correction coefficients are not within the range, they are restricted within the range. The acceleration/deceleration calculation unit 1D calculates the acceleration/decelerations of the respective joints based on the acceleration/deceleration correction coefficients (including the acceleration/deceleration correction coefficients restricted by the correction coefficient check unit 1C) and on basic acceleration/decelerations preset to the respective joints.

The main joint determination unit 1E determines a joint having a largest (longest) moving time (which is determined as a main joint) based on the moving times (rotational driving time) of the respective joints derived by the interpolating calculation of the interpolation calculation means 2. Further, the acceleration/deceleration adjustment unit 1F calculates the acceleration/decelerations of the joints other than the main joint again and adjusts the drive of the respective joints (motion of the manipulator 100 in its entirety).

The interpolation-calculation means 2 interpolates the driving loci, motion speeds, and the like of the respective joints based on the acceleration/decelerations and the like calculated by the acceleration/deceleration calculation unit 1D. Further, the signal output means 3 outputs drive signals including the acceleration/decelerations of the respective joints calculated through the interpolation calculation means 2 to the a manipulator 100.

Here, in the embodiment, it is assumed that the acceleration/deceleration control means 1, the interpolation calculation means 2 and the signal output means 3 are realized by, for example, the control processor (computer) having the CPU as the central portion thereof, and the control processor carries out the processings carried out by the means described above and by the respective units constituting the means, and processes the result of calculation as data. In this case, procedures of processing which the respective units and means carry out are stored in the data storage means 4 as programs.

The data storage means 4 stores data necessary for the acceleration/deceleration control means 1, the interpolation calculation means 2, and the signal output means 3 to carry out the processings. For example, the data storage means 4 stores data such as the aspect of a payload 200 (mass, position of center of gravity), which is necessary for the gravity torque calculation unit 1A to calculate gravity torque, data including the mechanism parameters (for example, masses of respective arms (links), arm length, position of center of gravity) of the a manipulator 100, and data of teaching points such as a motion start point, a motion end point, and the like. Further, the data storage means 4 stores data of a gravity compensation coefficient for calculating an acceleration correction coefficient. Further, the data storage means 4 stores data of a maximum value and a minimum value for the correction coefficient check unit 1C to check an acceleration/deceleration correction coefficient and data of the basic acceleration/deceleration used for calculating an acceleration/deceleration in the acceleration/deceleration calculation unit 1D.

Figure 2:
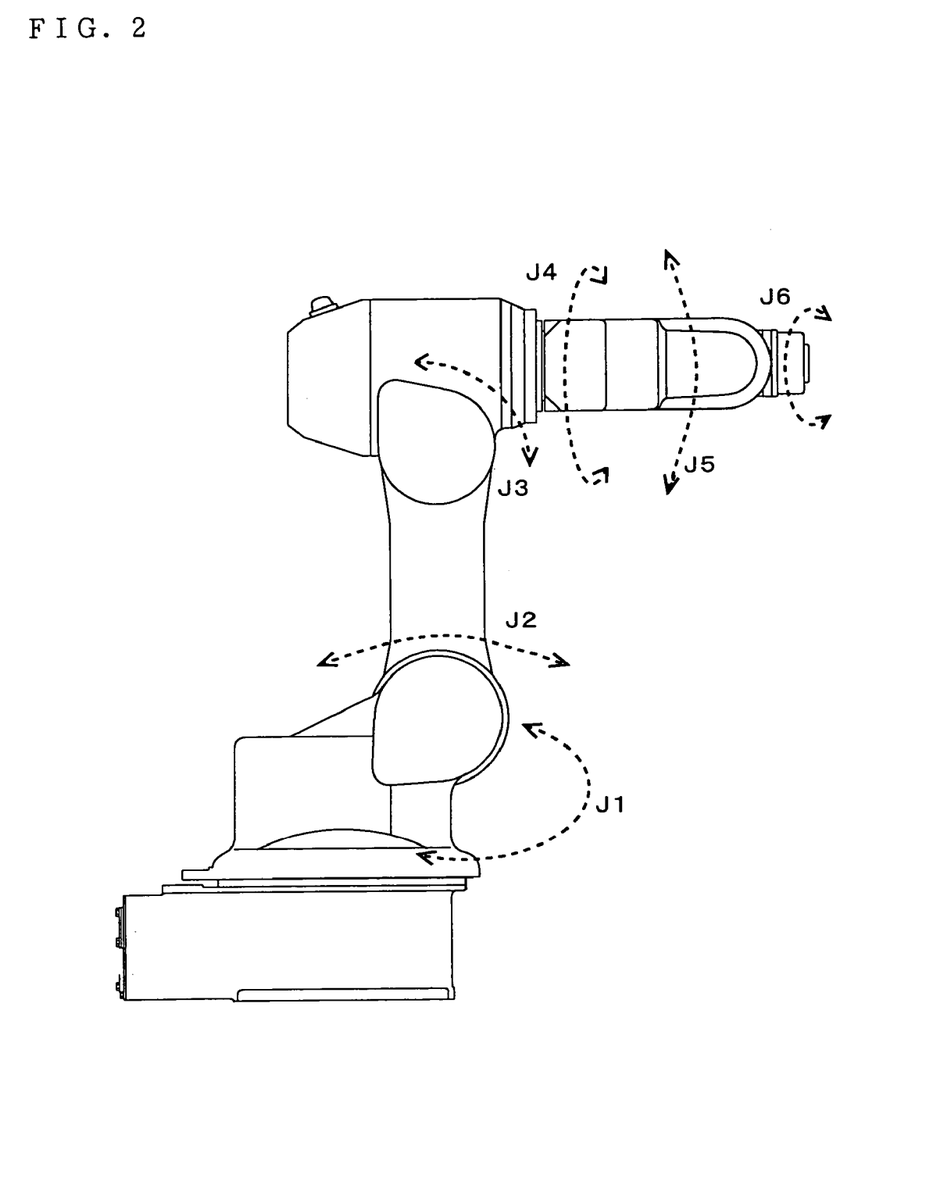
FIG. 2 is a view showing an example of a manipulator 100.

FIG. 2 is a view showing an example of the a manipulator 100. Although an articulated manipulator such as a 6-axis vertical articulated robot and the like is explained here as a manipulator 100, the type of the manipulator such as the number of axes and the like is not particularly limited as long as it is operated in an environment in which the effect of gravity must be taken into consideration. Further, the present invention can be also applied to a machine having joints (shafts) which must be operated in consideration of the effect of gravity, in addition to the manipulator. The payload 200 is, for example, a carried product and the like gripped by the manipulator 100.

Next, the processings of the embodiment will be explained mainly as to the acceleration/deceleration control means 1. The gravity torque calculation unit 1A calculates gravity torque Tg generating in the respective joints based on the attitude of the manipulator 100 at the time of a start and an end of a motion. Although method of calculating the gravity torque Tg is not particularly limited, it is different depending on the conditions (mass, position of center of gravity) of the payload 200, the type of the manipulator such as the mechanism parameter thereof, and the like or on inclination (horizontal distance) of arms and the like. Here, when the manipulator 100 is installed such that the base portion thereof is disposed vertically, the gravity torque Tg is 0 as to a joint that makes rotation of J1.

Here, torque that can be used to accelerate and decelerate the manipulator 100 is the maximum output of a motor and the gravity torque Tg. Thus, acceleration/deceleration torque that can be used to accelerate and decelerate (drive) a joint of the manipulator 100 is calculated by the following equation (1). Then, when acceleration/deceleration torque Tac is normalized by the maximum output torque Tp of the motor, the following equation (2) is obtained. Here, Tg/Tp is called normalized gravity torque value (dimensionless). Note that although the equations (1) and (2) are based on the maximum output torque Tp that can most be used in the acceleration and deceleration of the manipulator 100, they can be applied even if they are not based on the maximum out put torque.

$$Tac = Tp + Tg \quad (1)$$

$$Tac/Tp = (Tp + Tg)/Tp \quad (2)$$
$$= 1 + Tg/Tp$$

The acceleration/deceleration correction coefficient calculation unit 1B calculates an acceleration/deceleration correction coefficient K to be multiplied by the basic acceleration/deceleration in the calculation of the acceleration/decelerations of respective joints. A basic equation for calculating the acceleration/deceleration correction coefficient K is shown by the following equation (3). In the equation (3), a reason why the absolute value of Tg is used is to increase the degree of freedom of adjustment of acceleration/deceleration by setting the sign of the gravity compensation coefficient Kg in place of changing the sign of Tg. A reason why 1 is subtracted in braces is to set a reference to 0 (the reference is set to 0 when gravity torque Tg=0 so that the gravity compensation coefficient Kg does not, affect the acceleration/deceleration correction coefficient K). The value in the braces is finally set to the same value as the normalized gravity torque value described above. In contrast, a reason why 1 is added to the product of the normalized gravity torque value and the gravity compensation coefficient Kg is to set the reference of the acceleration/deceleration correction coefficient K to 1 (so that K=1 is established when gravity torque Tg=0)

$$K = ((Tp + |Tg|)/Tp - 1)Kg + 1 \quad (3)$$
$$= (|Tg| \cdot Kg + Tp)/Tp$$
$$= (|Tg|/Tp)Kg + 1$$

The gravity compensation coefficient Kg of the equation (3) is a coefficient set to adjust the effect of the acceleration/deceleration correction coefficient K depending on the magnitude of the gravity torque Tg. When Kg>0, the acceleration/deceleration correction coefficient K is larger than 1, thereby the acceleration/deceleration is increased. When Kg<0, the acceleration/deceleration correction coefficient is smaller than 1, thereby the acceleration/deceleration is suppressed. When Kg=0, the gravity torque Tg does not act on the effect of the acceleration/deceleration. Here, as shown in Table 1, in the embodiment, four types of Kg, which are divided to joint (rotation) drive directions θ' (directions same as and opposite to a gravity acting direction) and to acceleration and deceleration, are set for the gravity compensation coefficient Kg. In general, a problem of torque saturation occurs when acceleration is carried out in a direction opposite to the gravity acting direction, and a problem of residual vibration occurs when positioning carried out (accompanied with deceleration). Thus, the gravity compensation coefficients Kg (Kgaf, Kgdf, Kgar, kgdr) are set by dividing types depending on the drive directions and the acceleration/deceleration so that acceleration/decelerations can be set in consideration of the problems of torque saturation and residual vibration.

TABLE 1

| | JOINT DRIVE DIRECTION θ' | |
| --- | --- | --- |
| | DIRECTION SAME AS GRAVITY ACTING DIRECTION $Tg \times \theta' \geq 0$ | DIRECTION OPPOSITE TO GRAVITY ACTING DIRECTION $Tg \times \theta' < 0$ |
| ACCELERATION | K g a f | K g a r |
| DECELERATION | K g d f | K g a r |

Figure 3:
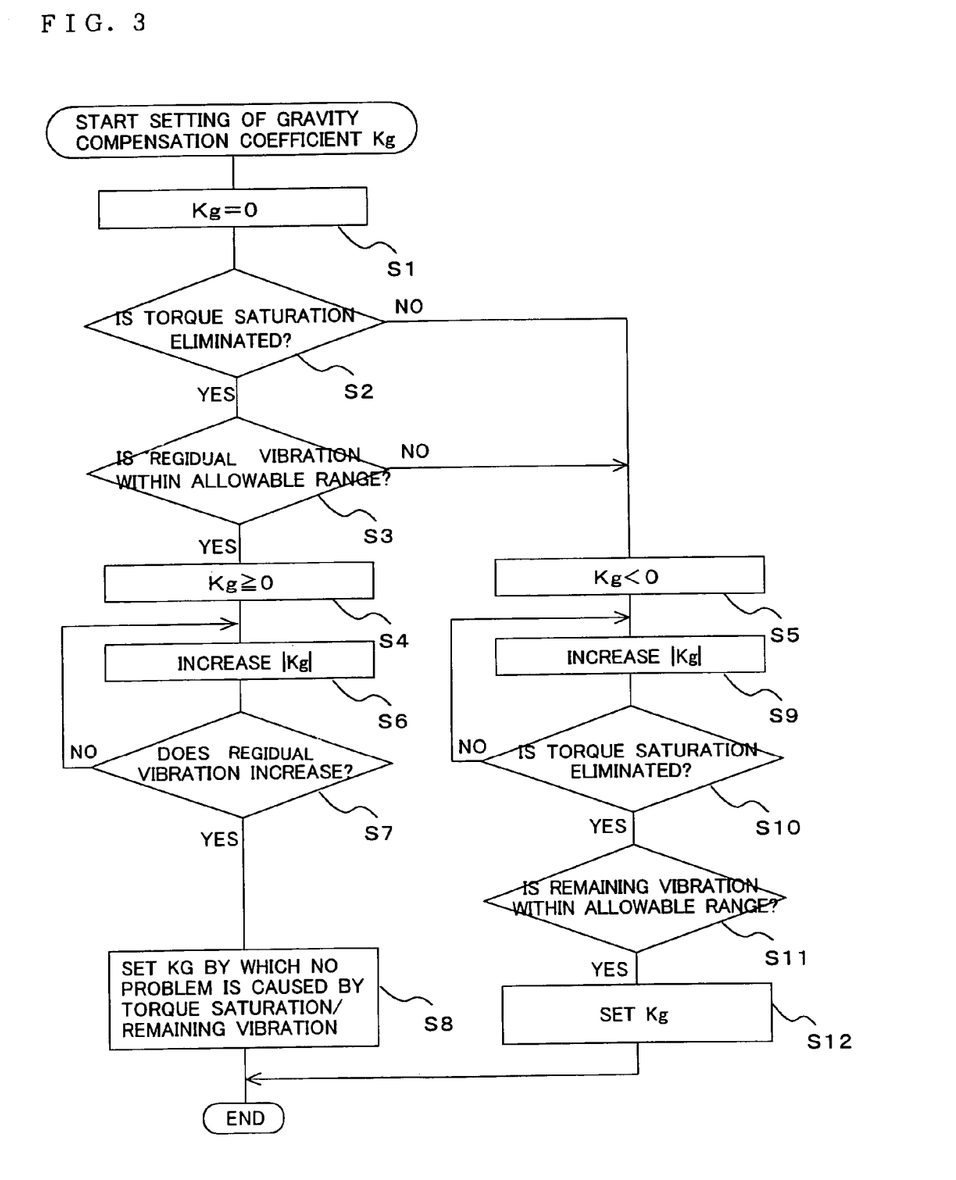
FIG. 3 is a view showing a flowchart of a processing for setting a gravity compensation coefficient Kg.

FIG. 3 is a view showing a flowchart of a processing until the gravity compensation coefficient Kg is set. First, Kg=0 (at the time, K=0) is set (S1). Then, when, for example, acceleration is carried out in a direction opposite to the gravity acting direction, it is determined whether or not torque saturation occurs at joints (S2). Further, it is determined whether or not the residual vibration is within an allowable range (S3). The torque saturation and the residual vibration are-measured by actual measurement calculation simulation, or the like. Unless the torque saturation and the residual vibration do not occur, the gravity compensation coefficient Kg satisfying kg≧0 is determined to be set (S4). In contrast, when they occur, it is determined to set Kg to satisfy Kg<0 (S5).

When Kg≧0 is determined at S4, |Kg| is increased (in positive direction) (S6), and it is determined whether or not the residual vibration increases (S7). When it is determined that the residual vibration does not increase, the process returns to S6 and further increases |Kg|. Whereas when it is determined that the residual vibration increases, the gravity compensation coefficient Kg is set to such a value that no problem is caused by the torque saturation and the residual vibration (for example, to the value before it is increased at a previous step) (S8). When it is determined at step S7 that the residual vibration increases, the gravity compensation coefficient Kg is set at once at S8. However, it may be set after |Kg| is increased until, for example, the residual vibration exceeds the allowable range. Note that although the range of increase of |Kg| is not particularly limited at step S6, it can be more minutely set by reducing the range of increase of |Kg|.

When Kg<0 is determined at step S5, |Kg| is increased (in negative direction) (S9), and it is determined whether or not the torque saturation is eliminated (S10). When the torque saturation is not eliminated, the process returns to step S9 at which the |Kg| is further increased. When the torque saturation is eliminated, it is further determined whether or not the residual vibration is within the allowable range (S11). When the residual vibration is not within the allowable range, the process returns to step S10 at which |Kg| is further increased. When the residual vibration is within the allowable range, a value at the time is set as the gravity compensation coefficient Kg (S12).

The acceleration/deceleration correction coefficients K (Kaf, Kdf, Kar, Kdr), which are calculated by applying the gravity compensation coefficient Kg (Kgaf, Kgdf, Kgar, Kgdr) to the equation (3), respectively, are shown by the following equations (4)-(7).

$$Kaf=(|Tg|/Tp)Kgaf+1 \quad (4)$$

$$Kdf=(|Tg|/Tp)Kgdf+1 \quad (5)$$

$$Kar=(|Tg|/Tp)Kgar+1 \quad (6)$$

$$Kdr=(|Tg|/Tp)Kgdr+1 \quad (7)$$

The correction coefficient check unit 1C checks whether or not the acceleration/deceleration correction coefficients K of the respective joints calculated by the acceleration/deceleration correction coefficient calculation unit 1B is within the range between a minimum value Kmin and t a maximum value Kmax as shown by the following equation (8). When it is desired to restrict the acceleration/deceleration depending on the attitude of the manipulator 100 such as, for example, a large amount of inclination of the manipulator 100, and the like, the effect of the acceleration/deceleration correction coefficient is restricted. When it is determined that Kmax>K, K=Kmax is set, whereas when it is determined that Kmin<K, K=Kmin is set. Note that, in the embodiment, although the minimum value Kmin and the maximum value Kmax are set to different values to the respective joints, they are not limited thereto and may be set to the same values regardless of the joints.

$$Kmin \leq K \leq Kmax \quad (8)$$

The acceleration/deceleration calculation unit 1D calculates the acceleration/decelerations of the respective joints based on the acceleration/deceleration correction coefficient K that is checked by the correction coefficient check unit 1C and fixed. When acceleration is carried out here, a basic acceleration speed Aab set to the respective joints is multiplied by the acceleration/deceleration correction coefficient Kaf or Kar. Further, when deceleration is carried out, a basic deceleration speed Adb is multiplied by the acceleration/deceleration correction coefficient Kdf or Kdr. Here, the basic acceleration speed Aab and the basic deceleration speed Adb are a basic acceleration speed or a basic deceleration speed at the time when, for example, acceleration or deceleration to a basic attitude and the like is carried out from an attitude in which the arm is extended, an attitude in which the arm is contracted (basic attitude), and the like. When a joint (rotation) drive direction is the same direction (Tg×θ'>0) as the gravity acting direction, an acceleration speed Aac and a deceleration speed Adc are shown by the following equations (9) and (10), respectively.

$$Aac=Kaf \times Aab \quad (9)$$

$$Adc=Kdf \times Adb \quad (10)$$

Further, when the joint (rotation) drive direction is an opposite direction (Tg>θ'<0) to the gravity acting direction, the acceleration speed Aac and the deceleration speed Adc are shown by the following equations (11) and (12), respectively.

$$Aac=Kar \times Aab \quad (11)$$

$$Adc=Kdr \times Adb \quad (12)$$

The interpolation calculation means 2 carries out a calculation for interpolating loci (positions), speeds, and the like of the respective joints from the start of motion to the end of motion thereof such that the motion of the manipulator 100 starts so that the joints are accelerated at the acceleration speeds calculated by the acceleration/deceleration calculation unit 1D and the motion thereof is ended so that the joints are decelerated at the deceleration speeds calculated thereby.

The main joint determination unit 1E calculates the moving times (rotation drive times) of the respective joints based on the acceleration/decelerations and the like of the respective joints, determines a joint having a largest moving time among the joints, and sets the joint as the main joint. The maximum moving time corresponds to the moving time of the overall manipulator 100. Accordingly, since the respective joints other than the main joint may be adjusted to have the maximum moving time, they have an allowance to the calculated moving times (for example, the joints other than the main joint need not be accelerated or decelerated at maximum output torque). Thus, the acceleration/deceleration adjustment unit 1F sets the joint having the maximum moving time as the main joint and finally determines the acceleration/decelerations of the respective joints by recalculating the acceleration/deceleration thereof. Here, a method and a procedure of the recalculation are not particularly limited. For example, since the residual vibration is liable to be caused by abrupt deceleration, occurrence of the residual vibration can be suppressed by adjusting the acceleration/deceleration within the range of the maximum moving time. The interpolation calculation means 2 further carries out an interpolation calculation based on the adjusted acceleration/decelerations.

The signal output means 3 outputs a drive signal for driving the manipulator 100 thereto based on the loci, speeds, and the like calculated by the interpolation calculation means 2 according to the acceleration/decelerations and the like of the respective joints. A current is supplied to the respective joints of the manipulator 100 based on the drive signal, thereby joint drive motors are rotated (driven), and the manipulator 100 is operated.

As described above, according to the embodiment 1, since the gravity torque calculation unit 1A calculates the gravity torque Tg of the respective joints of the manipulator 100, the acceleration/deceleration correction coefficient calculation unit 1B determines the acceleration/deceleration correction coefficient K after it adjusts normalized gravity torque value (gravity torque) using the gravity compensation coefficient Kg selected from a plurality of gravity compensation coefficients Kg set based on a drive mode (different drive directions, different accelerations/decelerations of the motors), and the acceleration/deceleration calculation unit 1D determines the acceleration and deceleration speeds of the respective joints by multiplying the basic acceleration/deceleration by the acceleration/deceleration correction coefficients K, acceleration/deceleration deceleration speeds, which appropriately cope with the effect of gravity, can be calculated according to a drive mode by a simple calculation (algorithm). In particular, since the gravity compensation coefficient Kg (Kgaf, Kgdf, Kgar, Kgdr) is set to each of the different drive directions and the accelerations and decelerations of each motor, the acceleration/decelerations can be calculated after they are adjusted based on a mode in which the effect of torque saturation at the time of acceleration in the same direction as the gravity acting direction and the effect of residual vibration at the time of positioning accompanied with deceleration are liable to occur. Thereby, the torque saturation can be prevented and the residual vibration can be suppressed effectively.

Further, since the maximum value and the minimum value of the acceleration/deceleration correction coefficient K is set and the acceleration/deceleration correction coefficient is restricted to the maximum value or the minimum value by the correction coefficient check unit 1C, the acceleration/deceleration can be restricted in the case when, for example, the manipulator inclines in a large amount, thereby the safety of the manipulator can be secured. Further, since main joint determination unit 1E determines the main joint based on the moving times of the respective joints and the acceleration/deceleration adjustment unit 1F adjusts the acceleration/decelerations by recalculating them according to the maximum moving time of the joints (the operation time of the overall manipulator 100), the acceleration/decelerations of the joints other than the main joint have an allowance. Thereby the torque saturation can be further prevented and the residual vibration can be further suppressed.

REFERENCE NUMERALS 1 acceleration/deceleration control means, 1A gravity torque calculation unit, 1B acceleration/deceleration correction coefficient calculation unit, 1C correction coefficient check unit, 1D acceleration/deceleration calculation unit, 1E main joint determination unit, 1F acceleration/deceleration adjustment unit, 2 interpolation calculation means, 3 signal output means, 4 data storage means, 10 manipulator controller, 100 manipulator, 200 payload

The invention claimed is:

1. An acceleration/deceleration control apparatus, characterized by comprising:
   gravity torque calculation means for calculating gravity torque acting on a joint drive motor for operating an articulated manipulator;
   acceleration/deceleration correction coefficient calculation means for calculating an acceleration/deceleration correction coefficient based on the gravity torque and a gravity compensation coefficient, which is selected from a plurality of preset gravity compensation coefficients based on a drive mode affected by gravity; and
   acceleration/deceleration calculation means for calculating the acceleration speed and/or the deceleration speed of the joint drive motor based on the acceleration/deceleration correction coefficient and a set basic acceleration/deceleration.

2. An acceleration/deceleration control apparatus according to claim 1, characterized by further comprising coefficient check means for restricting the acceleration/deceleration correction coefficient calculated by the acceleration/deceleration correction coefficient calculation means to a maximum value or a minimum value based on the maximum value and/or the minimum value set to the acceleration/deceleration correction coefficient.

3. An acceleration/deceleration control apparatus according to claim 1, characterized by further comprising:

determination means for determining a joint having a maximum moving time based on the moving times of respective joints; and acceleration/deceleration adjustment means for recalculating acceleration speeds and/or deceleration speeds in conformity with the maximum moving time as to the joints other than the joint having the maximum moving time.

4. An acceleration/deceleration control method according to claim 1, characterized in that the acceleration/deceleration correction coefficient is a value obtained by dividing the sum of the absolute value of the gravity torque and the output torque of the joint drive motor by the output torque, subtracting 1 from the value obtained by the division, multiplying the value obtained by the subtraction by the gravity compensation coefficient, and adding 1 to the value obtained by the multiplication.

5. An acceleration/deceleration control apparatus, characterized by comprising:

gravity torque calculation means for calculating gravity torque acting on a joint drive motor for driving a joint provided in an articulated manipulator, in the attitudes of the articulated manipulator at the start of a motion and at the end of the motion, based on data as to the start and the end of the motion of the articulated manipulator and based on data as to the mechanism parameter and/or the payload of the articulated manipulator;

acceleration/deceleration correction coefficient calculation means for calculating an acceleration/deceleration correction coefficient at the time when acceleration and/or deceleration is carried out in the above motion based on gravity compensation coefficients determined according to the drive directions and the acceleration/deceleration of the joint drive motor, the gravity torque, and the output torque of the joint drive motor; and acceleration/deceleration calculation means for calculating the acceleration speed and/or the deceleration speed of the joint drive motor by multiplying the acceleration/deceleration correction coefficient by the basic acceleration/deceleration set to the joint.

6. An acceleration/deceleration control apparatus according to claim 5, characterized by further comprising coefficient check means for restricting the acceleration/deceleration correction coefficient calculated by the acceleration/deceleration correction coefficient calculation means to a maximum value or a minimum value based on the maximum value and/or the minimum value set to the acceleration/deceleration correction coefficient.

7. An acceleration/deceleration control method according to claim 5, characterized in that the acceleration/deceleration correction coefficient is a value obtained by dividing the sum of the absolute value of the gravity torque and the output torque of the joint drive motor by the output torque, subtracting 1 from the value obtained by the division, multiplying the value obtained by the subtraction by the gravity compensation coefficient, and adding 1 to the value obtained by the multiplication.

* * * * *